United States Patent
Asada et al.

(10) Patent No.: US 7,237,956 B2
(45) Date of Patent: Jul. 3, 2007

(54) HYDRODYNAMIC BEARING AND DISC ROTATION APPARATUS USING THE SAME

(75) Inventors: Takafumi Asada, Hirakata (JP); Hiroaki Saito, Ozu (JP); Keigo Kusaka, Ozu (JP); Daisuke Itou, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 556 days.

(21) Appl. No.: 10/727,860

(22) Filed: Dec. 4, 2003

(65) Prior Publication Data

US 2004/0136625 A1    Jul. 15, 2004

(30) Foreign Application Priority Data

Dec. 6, 2002    (JP)    ............................. 2002-355156

(51) Int. Cl.
    *F16C 32/06*    (2006.01)
(52) U.S. Cl. ..................... 384/107; 384/121; 384/123
(58) Field of Classification Search .......... 384/100–132
    See application file for complete search history.

(56) References Cited

U.S. PATENT DOCUMENTS 5,504,637 A * 4/1996 Asada et al. ............. 360/98.07
6,023,114 A * 2/2000 Mori et al. .................... 310/90
6,033,118 A * 3/2000 Asai et al. ................... 384/115
6,196,722 B1 * 3/2001 Asada et al. ................ 384/107
2003/0185473 A1* 10/2003 Gomyo et al. .............. 384/107

FOREIGN PATENT DOCUMENTS

WO    WO02/04825 A1 *    1/2002

\* cited by examiner

*Primary Examiner*—Thomas R. Hannon
*Assistant Examiner*—Justin Krause
(74) *Attorney, Agent, or Firm*—Akin Gump Strauss Hauer & Feld LLP

(57) ABSTRACT

A high-accuracy, long-life hydrodynamic bearing that does not cause oil film breakage in bearing clearances and a disc rotation apparatus using the bearing is disclosed. Oil film breakage is avoided as negative pressure is prevented from generating between the shaft and sleeve of the hydrodynamic bearing. Herringbone shaped dynamic pressure generating grooves, located on the thrust bearing section and the radial bearing section of the hydrodynamic bearing, are oil filled and have optimum shapes. The optimum shapes prevent the generation negative pressure and thus prevents the coagulation of air bubbles that can cause oil film breakage. The disc rotation apparatus, that holds a reproduction/recording disc, is concentrically secured to the hydrodynamic bearing and rotated. The disc is put into contact with magnetic or optical heads while rotating in the disc rotation apparatus. Both the hydrodynamic bearing and the disc rotation apparatus experience high reliability.

4 Claims, 16 Drawing Sheets

HYDRODYNAMIC BEARING AND DISC ROTATION APPARATUS USING THE SAME

BACKGROUND ART

1. Technical Field

The present invention relates to a hydrodynamic bearing having fluid in its rotation section and a disc rotation apparatus having the same.

2. Prior Art

In recent years, in recording apparatuses using discs and the like, their memory capacities are increasing and their data transfer speeds are rising. Hence, a disc rotation apparatus for use in this kind of recording apparatus is required to rotate at high speed and with high accuracy, and a hydrodynamic bearing is used in its rotating main shaft section.

A conventional hydrodynamic bearing and an example of a disc rotation apparatus having the same will be described below referring to FIG. 12 to FIG. 16. FIG. 12 is a cross-sectional view showing the right portion of the center line C indicating the center of the rotation shaft of the conventional hydrodynamic bearing. In FIG. 12, a shaft 31 is rotatably inserted into a sleeve 32 having a bearing hole 32A. At the lower end of the shaft 31, a flange 33 is provided so as to be integrated therewith. The lower end of the flange 33 is accommodated in a recess portion formed by a hole in a base 35 and the sleeve 32 and rotatably held so as to be opposed to a thrust plate 34 mounted on the base 35. A hub rotor 36, a rotor magnet 38, a plurality of discs 39, spacers 40 and a clamper 41 are secured to the shaft 31. A motor stator 37 opposed to the rotor magnet 38 is installed on the base 35. Dynamic pressure generation grooves 32B and 32C indicated by broken lines are provided on the inner circumferential face of the bearing hole 32A of the sleeve 32. Dynamic pressure generation grooves 33A are provided on the upper face of the flange 33, a face opposed to the sleeve 32. In addition, dynamic pressure generation grooves 33B are provided on the lower face of the flange 33, a face opposed to the thrust plate 34. The clearances between the shaft 31 and the sleeve 32, including the dynamic pressure generation grooves 32B, 32C, 33A and 33B, are filled with oil.

The operation of the conventional hydrodynamic bearing shown in FIG. 12 will be described below. In FIG. 12, when electric power is applied to the coil of the stator 37, a rotating magnet field is generated, and a rotation force is generated in the rotor magnet 38, whereby the shaft 31 and the flange 33 rotate together with the hub rotor 36 and the discs 39. During the rotation, dynamic pressures are generated in the oil by the dynamic pressure generation grooves 32B, 32C, 33A and 33B, and the shaft 31 is floated in the upward direction of the figure and rotates while holding space from the sleeve 32 and without making contact with the thrust plate 34 and the sleeve 32. Magnet heads, not shown, make contact with the discs 39 and carry out the recording and reproduction of electrical signals.

The conventional hydrodynamic bearing configured as described above had problems described below. FIG. 13 is a plan view of the flange 33 which is provided with a plurality of the dynamic pressure generation grooves 33A indicated by black-colored regions. FIG. 14 is a bottom view of the flange 33 which is similarly provided with a plurality of the dynamic pressure generation grooves 33B indicated by black-colored regions. The outside diameters of the patterns of the dynamic pressure generation grooves 33A and 33B on the top and bottom faces are represented by D1$o$ and D2$o$, respectively, and their inside diameters are represented by D1$i$ and D2$i$, respectively. The diameters D1$m$ and D2$m$ of the respective turn-back parts of the dynamic pressure generation grooves 33A and 33B are set at sufficiently large values so that pumping pressures in the directions indicated by arrow E and arrow H, respectively, are raised.

FIG. 15 and FIG. 16 are views showing the cross sections of relevant parts in the vicinity of the lower end of the shaft 31 and showing pressures on the surfaces of the flange 33 and the shaft 31 of the above-mentioned conventional hydrodynamic bearing. If the pumping pressures in the directions indicated by arrows E and H shown in FIG. 13 and FIG. 14, respectively, are raised too high, a negative pressure with respect to atmospheric pressure is generated at the central portion of the lower face of the flange 33 as indicated by curve P1 in FIG. 15, whereby air bubbles mixed in the oil are coagulated and air is accumulated in a region 43B having a constant size.

In FIG. 16, the dynamic pressure generation grooves 32B and 32C of the sleeve 32 are made so that dimension L1 in the figure is larger than dimension L2, (L1>L2), and so that dimension L4 is larger than dimension L3, (L4>L3). In addition, the dimensional difference (L1−L2) is selected so as to be nearly equal to the dimensional difference (L4−L3), that is, (L1−L2)≈(L4−L3). As shown by ΔL in FIG. 16, in the case that the amount of the oil becomes slightly insufficient and the upper face of the oil is at the position lower than the upper ends of the dynamic pressure generation grooves 33B by dimension 4L, no oil is present in the portion corresponding to the dimension ΔL of the upper ends of the dynamic pressure generation grooves 33B, whereby the pressure distribution of oil is represented by curve P2 shown in FIG. 16. In addition, a negative pressure is generated at the lower portion of the range of the dimension L4 in the figure. Hence, air bubbles are accumulated in a region 43A, whereby there is a fear of breaking the oil film in this region 43A and of causing friction between the shaft 31 and the sleeve 32.

SUMMARY OF THE INVENTION

The present invention purports to provide a hydrodynamic bearing in which a negative pressure is prevented from generating between the shaft and the sleeve, whereby oil film breakage due to locally accumulated air in oil does not occur.

A hydrodynamic bearing in accordance with the present invention comprises a sleeve having a bearing hole at the nearly central portion thereof, a shaft rotatably inserted into the bearing hole of the above-mentioned sleeve, and a nearly disc-shaped flange, secured to one end of the above-mentioned shaft, one face of which is opposed to the end face of the sleeve 1 and the other face of which is opposed to a thrust plate provided to hermetically seal a region including the above-mentioned end face of the above-mentioned sleeve, wherein herringbone-shaped first and second dynamic pressure generation grooves are provided on at least one of the inner circumferential face of the above-mentioned sleeve and the outer circumferential face of the above-mentioned shaft so as to be arranged in the direction along the shaft, herringbone-shaped third dynamic pressure generation grooves are provided on at least one of the opposed faces of the flange and the thrust plate, the above-mentioned first, second and third dynamic pressure generation grooves are filled with oil having a kinematic viscosity of 4 cSt (centistokes) or more at 40° C. of temperature, one of the above-mentioned sleeve and the above-mentioned shaft is secured to a base and the other is secured to a rotatable hub rotor, and when the outside diameter of the herringbone pattern of the above-mentioned third dynamic pressure generation groove is designated as d1$o$, the inside diameter thereof is designated as d1$i$, the diameter of the turn-back part is designated as d1$m$, the value of the diameter d1$m$ being in the range of 1 mm or more and 10 mm or less, and the diameter of the turn-back part of the herring pattern, wherein the oil pressure generated by the above-mentioned third dynamic pressure generation grooves in the direction from the outer circumference to the inner circumference of the flange becomes equal to the oil pressure generated in the direction from the inner circumference to the outer circumference thereof, is designated as dsy and is represented by:

$$dsy = \{(d1i^2 + d1o^2)/2\}^{1/2},$$

where the diameter d1$m$ of the turn-back part is determined so that the value obtained by subtracting the diameter d1$m$ from the diameter dsy, (dsy−d1$m$), is in the range of 0.05 mm or more and 0.8 mm or less, that is, d1$m$=dsy−(0.05 to 0.8 mm).

A hydrodynamic bearing in accordance with another aspect of the present invention comprises a sleeve having a bearing hole at the nearly central portion thereof, a shaft rotatably inserted into the bearing hole of the above-mentioned sleeve, and a nearly disc-shaped flange, secured to one end of the above-mentioned shaft, one face of which is opposed to the end face of the sleeve 1 and the other face of which is opposed to a thrust plate provided to hermetically seal a region including the above-mentioned end face of the above-mentioned sleeve, wherein herringbone-shaped first and second dynamic pressure generation grooves are provided on at least one of the inner circumferential face of the above-mentioned sleeve and the outer circumferential face of the above-mentioned shaft so as to be arranged in the direction along the shaft, among the above-mentioned first and second dynamic pressure generation grooves, when the grooves away from the above-mentioned thrust plate are designated as the first dynamic pressure generation grooves and the grooves close thereto are designated as the second dynamic pressure generation grooves, the first length L1 of the groove portion, away from the above-mentioned thrust plate, of the above-mentioned herringbone-shaped first dynamic pressure generation groove in the direction of the shaft is larger than the second length L2 of the groove portion close to the above-mentioned thrust plate in the direction of the shaft, when the diameter of the above-mentioned shaft is in the range of 1 mm or more and 10 mm or less, the value obtained by subtracting the length L2 from the length L1 is set in the range of 0.05 or more and 1.5 mm or less, herringbone-shaped third dynamic pressure generation grooves are provided on at least one of the opposed faces of the flange and the thrust plate, the above-mentioned first, second and third dynamic pressure generation grooves are filled with oil having a kinematic viscosity of 4 cSt or more at 40° C. of temperature, and one of the above-mentioned sleeve and the above-mentioned shaft is secured to a base and the other is secured to a rotatable hub rotor.

A hydrodynamic bearing in accordance with another aspect of the present invention comprises a sleeve having a bearing hole at the nearly central portion thereof, a shaft rotatably inserted into the bearing hole of the above-mentioned sleeve, and a nearly disc-shaped flange, secured to one end of the above-mentioned shaft, one face of which is opposed to the end face of the sleeve 1 and the other face of which is opposed to a thrust plate provided to hermetically seal a region including the above-mentioned end face of the above-mentioned sleeve, wherein herringbone-shaped first and second dynamic pressure generation grooves are provided on at least one of the inner circumferential face of the above-mentioned sleeve and the outer circumferential face of the above-mentioned shaft, among the above-mentioned first and second dynamic pressure generation grooves, when the grooves away from the above-mentioned thrust plate are designated as the first dynamic pressure generation grooves and the grooves close thereto are designated as the second dynamic pressure generation grooves, the first length L1 of the groove portion, away from the above-mentioned thrust plate, of the above-mentioned herringbone-shaped first dynamic pressure generation groove in the direction of the shaft is larger than the second length L2 of the groove portion close to the above-mentioned thrust plate in the direction of the shaft, the above-mentioned herringbone-shaped second dynamic pressure generation groove is made symmetric with respect to a line passing through the herringbone-shaped turn-back parts, the value of a calculation expression, (L1+L2)/(2×L2) represented by using the above-mentioned first length L1 and the above-mentioned second length L2, is in the range of 1.02 to 1.60, herringbone-shaped third dynamic pressure generation grooves are provided on at least one of the opposed faces of the flange and the thrust plate, the above-mentioned first, second and third dynamic pressure generation grooves are supplied with oil having a kinematic viscosity of 4 cSt or more at 40° C. of temperature, one of the above-mentioned sleeve and the above-mentioned shaft is secured to a base and the other is secured to a rotatable hub rotor, and when the outside diameter of the herringbone pattern of the above-mentioned third dynamic pressure generation groove is designated as d1$o$, the inside diameter thereof is designated as d1$i$, the diameter of the turn-back part thereof is designated as d1$m$, and the diameter of the turn-back part of the herring pattern, wherein the oil pressure generated by the above-mentioned third dynamic pressure generation grooves in the direction from the outer circumference to the inner circumference of the flange becomes equal to the oil pressure generated in the direction from the inner circumference to the outer circumference thereof, is designated as dsy and is represented by:

$$dsy = \{(d1i^2 + d1o^2)/2\}^{1/2},$$

the diameter d1$m$ of the turn-back part is determined so that when the diameter of the above-mentioned shaft is in the range of 1 mm or more and 10 mm or less, the value obtained by subtracting the above-mentioned length L2 from the above-mentioned length L1 is set in the range of 0.05 mm or more and 1.5 mm or less, the diameter d1$m$ is in the range of 1 mm or more and 10 mm or less, and the value obtained by subtracting the diameter d1$m$ from the diameter dsy is in the range of 0.05 mm or more and 0.8 mm or less, that is, d1$m$=dsy: (0.05 to 0.8 mm).

In accordance with the above-mentioned configurations of the present invention, the patterns of the dynamic pressure generation grooves in the thrust bearing section and the radial bearing section have optimum shapes, whereby no negative pressure is generated inside the bearing. Hence, since air accumulation due to the coagulation of air bubbles can be prevented, it is possible to provide a hydrodynamic bearing not causing oil film breakage.

A disc rotation apparatus using the hydrodynamic bearing in accordance with the present invention records or reproduces signals, wherein a recording/reproduction disc is concentrically secured to the hub rotor of the hydrodynamic bearing in accordance with claims 1 to 5 and rotated, magnetic heads or optical heads are provided so as to be opposed to the faces of the above-mentioned rotating disc, and the magnetic heads or optical heads are configured so as to be movable in parallel with the faces of the above-mentioned disc. By using the hydrodynamic bearing in accordance with the present invention, it is possible to obtain a disc rotation apparatus being high in reliability like that of the bearing.

DESCRIPTION OF PREFERRED EMBODIMENT

Figure 1:
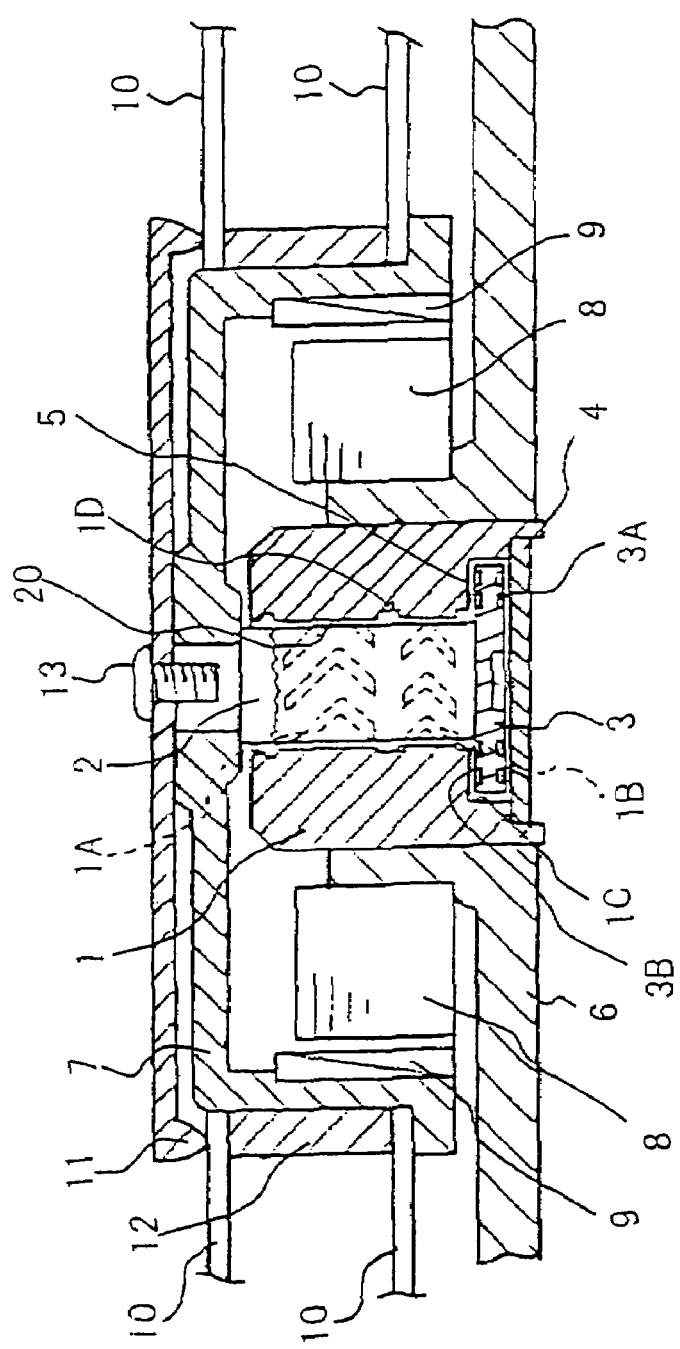
FIG. 1 is a cross-sectional view of a hydrodynamic bearing in accordance with a preferred embodiment of the present invention.

A preferred embodiment of a hydrodynamic bearing in accordance with the present invention will be described below referring to FIGS. 1 to 10. FIG. 1 is a cross-sectional view of a hydrodynamic bearing in accordance with an embodiment of the present invention. In FIG. 1, a sleeve 1 has a bearing hole 20 at its nearly central portion, and herringbone-shaped dynamic pressure generation grooves 1A and 1B are formed on the inner circumferential face of the bearing hole 20. A recess portion 1C is formed at the lower end of the sleeve 1. A shaft 2 is rotatably inserted into the bearing hole 20. A flange 3 is secured to the lower end of the shaft 2 so as to be accommodated in the recess portion 1C at the lower end of the sleeve 1. A thrust plate 4 is secured to the recess portion 1C of the sleeve 1 by a securing method, such as laser welding, precision crimping or bonding, and the recess portion 1C including the flange 3 is hermetically sealed. The sleeve 1 is secured to a base 6. The shaft 2 is secured to a hub rotor 7. Dynamic pressure generation grooves are provided on one of the opposed faces of the flange 3 and the thrust plate 4. In FIG. 1, dynamic pressure generation grooves 3A are provided on the lower face of the flange 3. Dynamic pressure generation grooves 3B are also provided on the upper face of the flange 3 opposed to the recess portion 1C of the sleeve 1. The insides of the dynamic pressure generation grooves 1A, 1B, 3A and 3B are filled with oil or grease. A rotor magnet 9 is installed in the hub rotor 7. In addition, a stator 8 is installed on the base 6 so as to be opposed to the above-mentioned rotor magnet 9. Two discs 10, for example, are installed on the hub rotor 7 via a spacer 12. The discs 10 are secured by a damper 11 installed on the shaft 2 by a screw 13.

The operation of the hydrodynamic bearing in accordance with this embodiment configured as mentioned above will be described with reference to FIGS. 1 to 10. In FIG. 1, first, when electric power is applied to the coil of the stator 8, a rotating magnet field is generated, and the rotor magnet 9 receives a rotation force, and the hub rotor 7, the shaft 2 and the discs 10 rotate together with the damper 11 and the spacer 12. By the rotation, the dynamic pressure generation grooves 1A, 1B, 3A and 3B rake up oil, and pressures are generated between the dynamic pressure generation grooves 1A and 1B and the shaft 2 and between the dynamic pressure generation grooves 3A and the thrust plate 4. Hence, the shaft 2 is floated in the upward direction of the figure and rotates without making contact with the thrust plate 4 and the sleeve 1.

Figure 2:
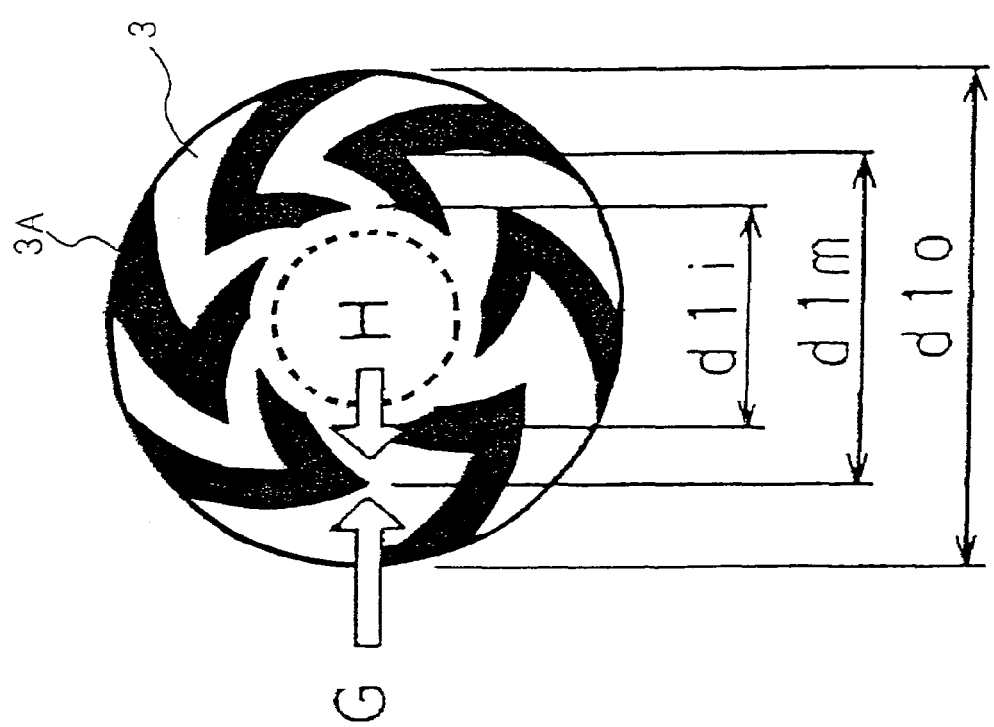
FIG. 2 is a bottom view of the flange 3 of the hydrodynamic bearing in accordance with this embodiment.

FIG. 2 is a view of the lower face of the flange 3, that is, the bottom face thereof opposing to the thrust plate 4, and the black-colored portions indicate the dynamic pressure generation grooves 3A. The outside diameter of the pattern of the dynamic pressure generation groove 3A is designated as $d1o$, the inside diameter thereof is designated as $d1i$ and the diameter of the turn-back part is designated as $d1m$.

When the flange 3 rotates inside the recess portion 1C of the sleeve 1, an oil pressure G is generated on the face of the flange 3 in the direction from the outer circumference to the inner circumference thereof. Furthermore, an oil pressure H is also generated in the direction from the inner circumference to the outer circumference thereof. The diameter of the turn-back part wherein the pressure G becomes equal to the pressure H is represented by dsy. Usually, the dynamic pressure generation grooves 3A are designed so that the pressure G becomes equal to the pressure H. For this purpose, the diameter d1m is determined by equation (1), a well-known equation in hydrodynamics.

$$d1m = \{(d1i^2 + d1o^2)/2\}^{1/2} \qquad (1)$$

However, the hydrodynamic bearing in accordance with the present invention is designed so that the pressure G becomes larger than the pressure H. In other words, when the diameter d1m has a value in the range of 1 mm or more and 10 mm or less and the relationship represented by equation (2) is established, the value of the diameter d1m is set so that the value obtained by subtracting the diameter d1m from the diameter dsy is in the range of 0.05 or more and 0.8 mm or less as represented by equation (3).

$$dsy = \{(d1i^2 + d1o^2)/2\}^{1/2} \qquad (2)$$

$$dsy - d1m = 0.05 \text{ to } 0.8 \text{ mm} \qquad (3)$$

Figure 3:
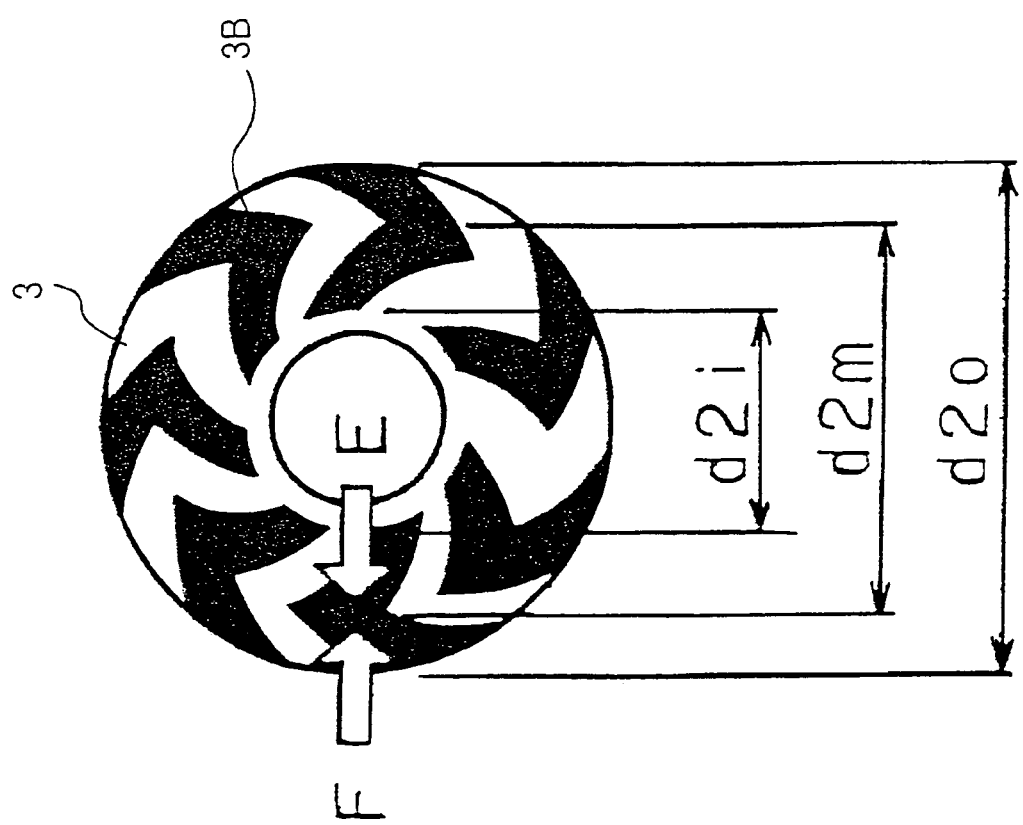
FIG. 3 is a plan view of the flange 3 of the hydrodynamic bearing in accordance with this embodiment.

FIG. 3 is a plan view of the flange 3, and the black-colored portions indicate the dynamic pressure generation grooves 3B. The dynamic pressure generation grooves 3B are designed so that the pressure in the direction indicated by arrow E from the inner circumference to the outer circumference is nearly balanced with the pressure in the direction indicated by arrow F from the outer circumference to the inner circumference. In other words, when the outside diameter of the pattern of the dynamic pressure generation groove 3B is designated as d2o, the inside diameter thereof is designated as d2i and the diameter of the turn-back part thereof is designated as d2m, a relationship represented by equation (4) is established.

$$d2m = \{(d2o^2 + d2i^2)/2\}^{1/2} \qquad (4)$$

Figure 4:
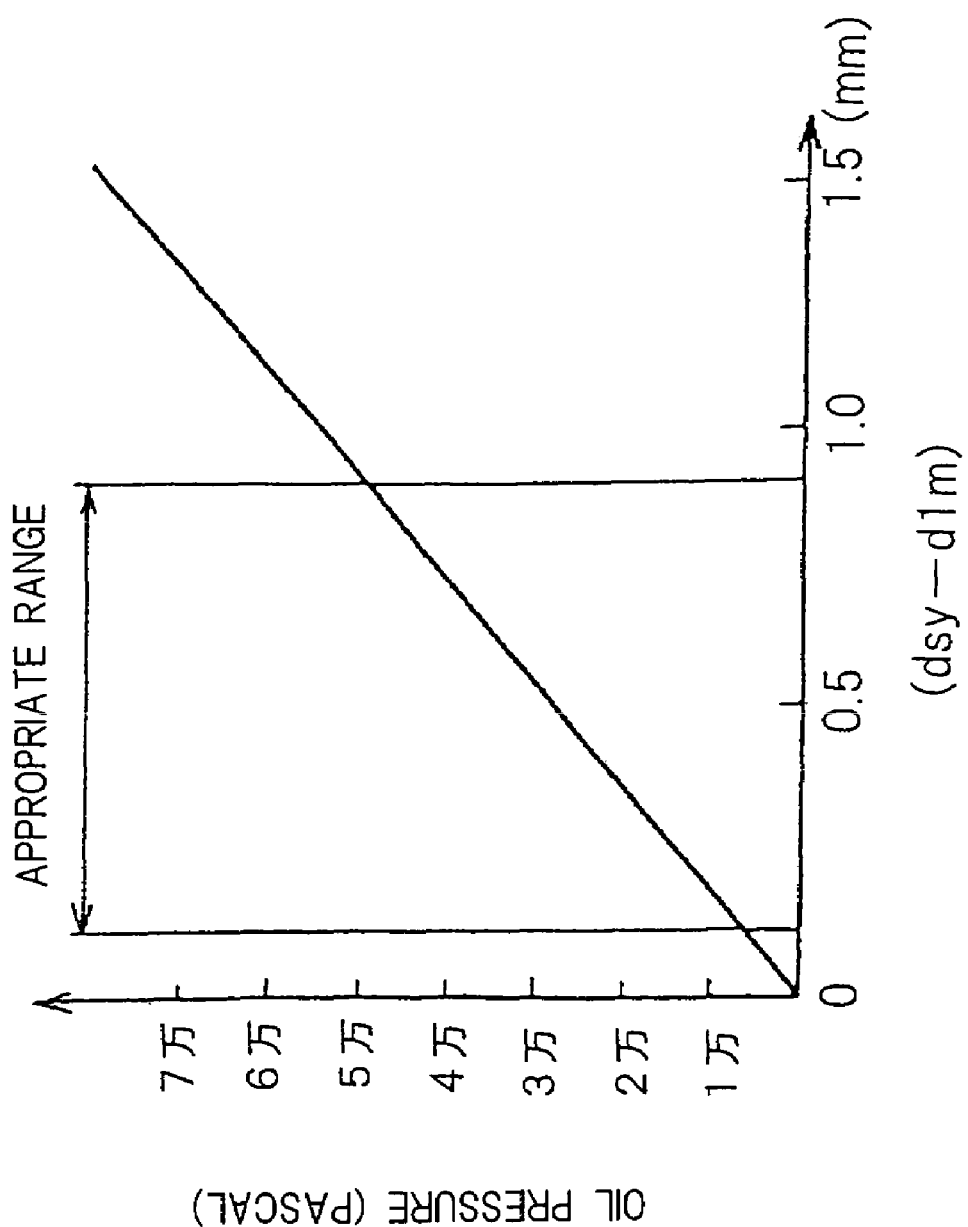
FIG. 4 is a graph showing the relationship between the pump pressure in the dynamic pressure generation grooves 3A of the flange 3 and the dimensional distribution of the diameter dsy of the turn-back part and the inside diameter $d1i$ of the dynamic pressure generation groove 3A in the hydrodynamic bearing in accordance with this embodiment.

The vertical axis of the graph in FIG. 4 represents the oil pressure (pascal) in the dynamic pressure generation groove 3A, which is variable depending on the value of the diameter difference (dsy−d1m). If asymmetry is insufficient in the pressures inside the bearing, a partially negative pressure portion is generated somewhere inside the bearing, and air may be accumulated there. On the other hand, if asymmetry is excessive, the internal pressure becomes too high, and there arises a danger of causing cavitation or microbubbles. Relating to the hydrodynamic bearing in accordance with this embodiment, a hydrodynamic bearing is made by using transparent materials for the sake of observation, and experiments are carried out. As a result, it was found that when the value of the above-mentioned dsy−d1m was in the range of 0.05 or more to 0.99 or less, the amount of air bubbles entered and the amount of air coagulated during rotation were minimal, whereby this range was an appropriate range and air is least likely to be accumulated in oil.

Figure 5:
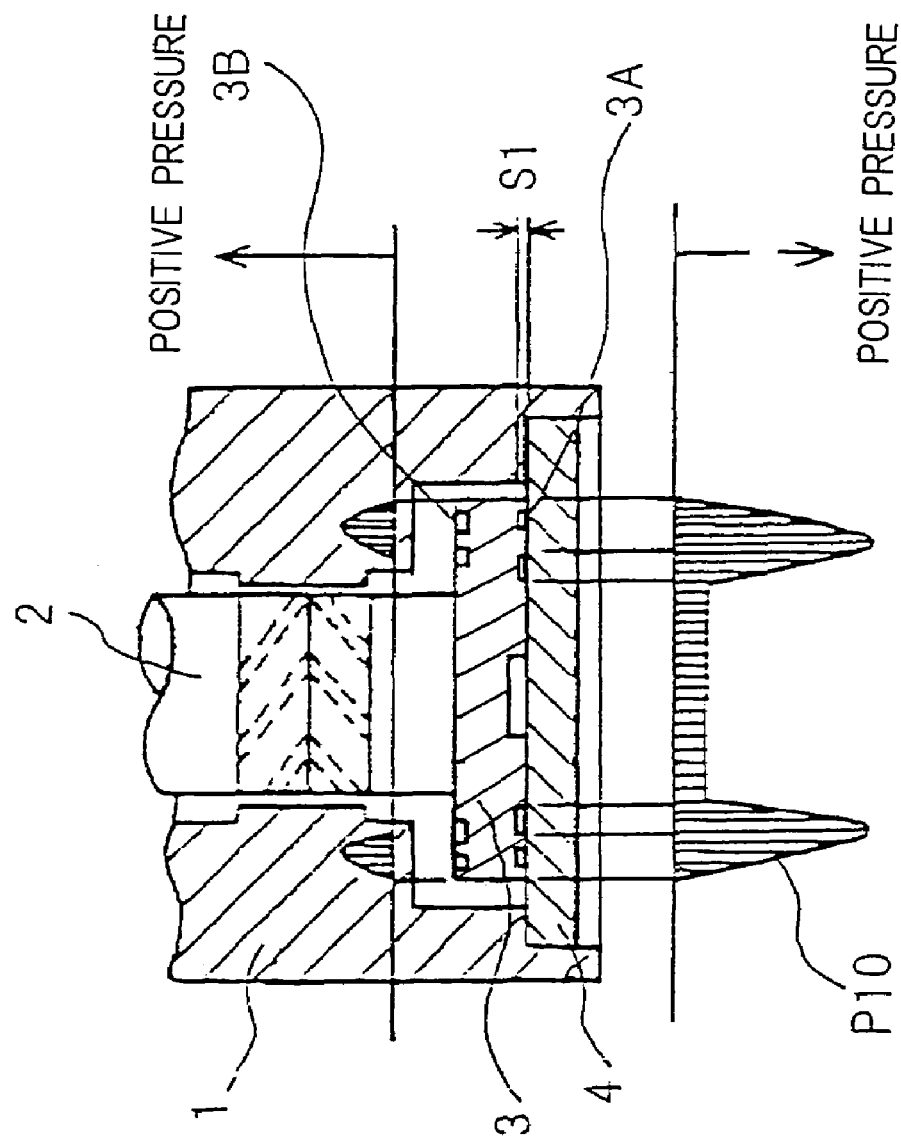
FIG. 5 is a cross-sectional view of a relevant part showing the distribution of oil pressure generated by the dynamic pressure generation grooves 3A and 3B in the case when the floating distance S1 between the flange 3 and the thrust plate 4 is sufficiently small in the hydrodynamic bearing in accordance with this embodiment.

FIG. 5 is a cross-sectional view showing the cross-section of a relevant part and the pressure distribution of oil by the dynamic pressure generation grooves 3A and 3B with reference to the atmospheric pressure in the case that the floating amount (S1) of the flange 3 from the thrust plate 4 is sufficiently small. In the hydrodynamic bearing in accordance with the present invention, only the positive pressure indicated by curve P10 representing the pressure distribution of oil is generated and no negative pressure is generated. For this reason, a phenomenon of air accumulation between the flange 3 and the thrust plate 4 hardly occurs.

Figure 6:
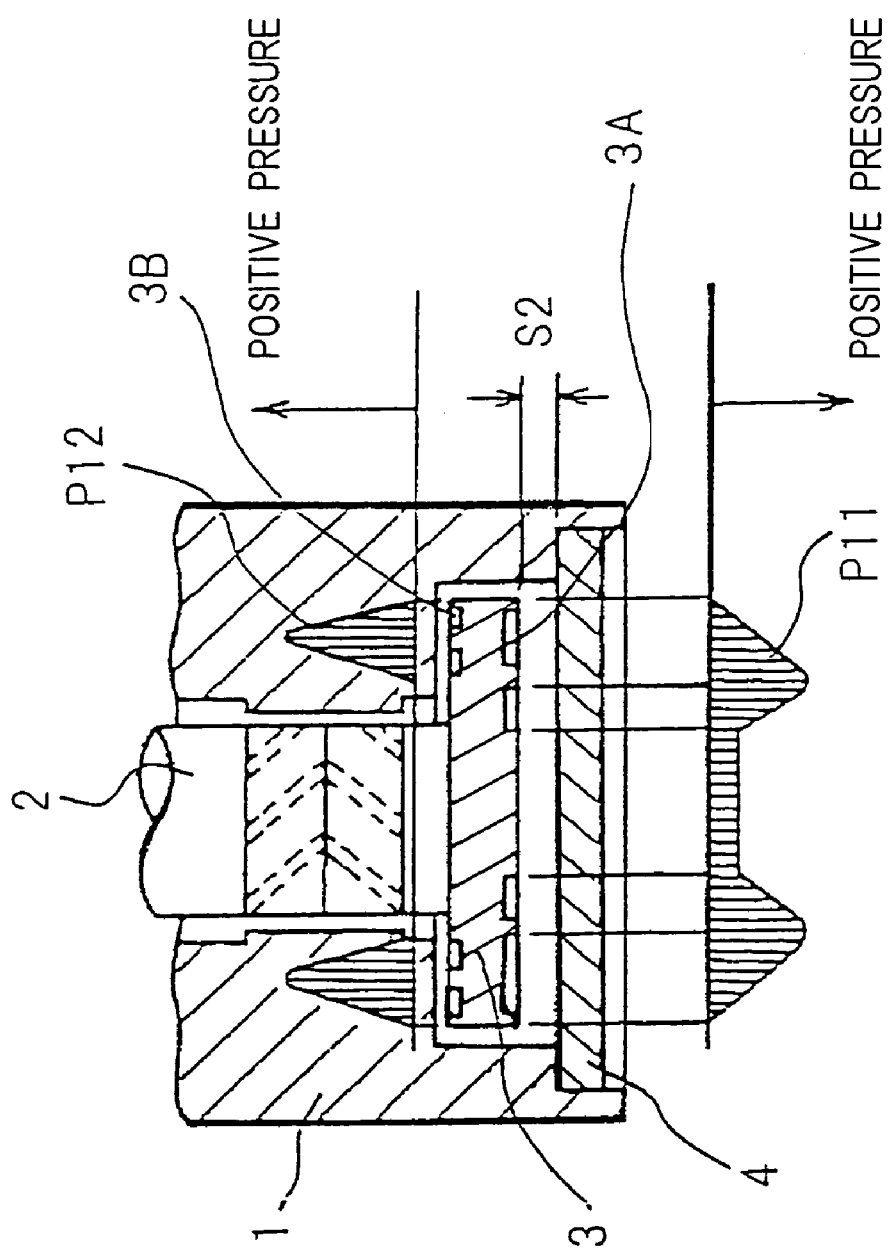
FIG. 6 is a cross-sectional view of a relevant part showing the distribution of oil pressure generated by the dynamic pressure generation grooves 3A and 3B in the case when the floating distance S2 between the flange 3 and the thrust plate 4 is sufficiently large in the hydrodynamic bearing in accordance with this embodiment.

FIG. 6 is a cross-sectional view showing the cross-section of a relevant part and the pressure distribution of oil by the dynamic pressure generation grooves 3A and 3B as indicated by pressure curves P11 and P12 in the case that the floating amount (S2) is sufficiently large. Even in this case, no negative pressure is generated inside the bearing as indicated by the pressure curve P11. In FIG. 6, the positive pressure indicated by the curve P12 of the pressure generated by the dynamic pressure generation grooves 3B on the upper face of the flange 3 prevents collision between the flange 3 and the sleeve 1.

Figure 7:
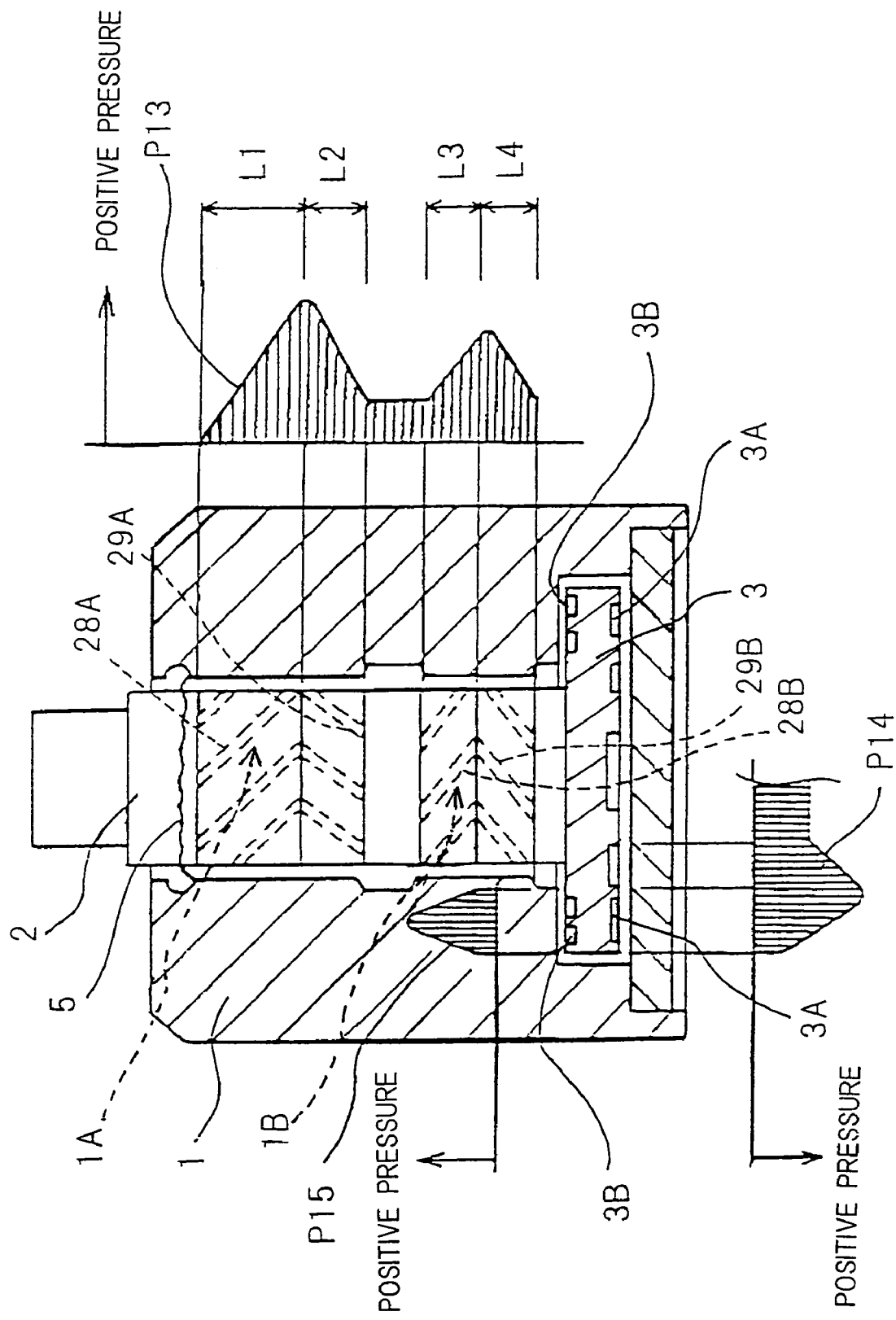
FIG. 7 is a cross-sectional view of a relevant part showing the distribution of oil pressure in the radial bearing section and the distribution of oil pressure generated by the dynamic pressure generation grooves 3A and 3B of the flange 3 of the hydrodynamic bearing in accordance with this embodiment.
Figure 8:
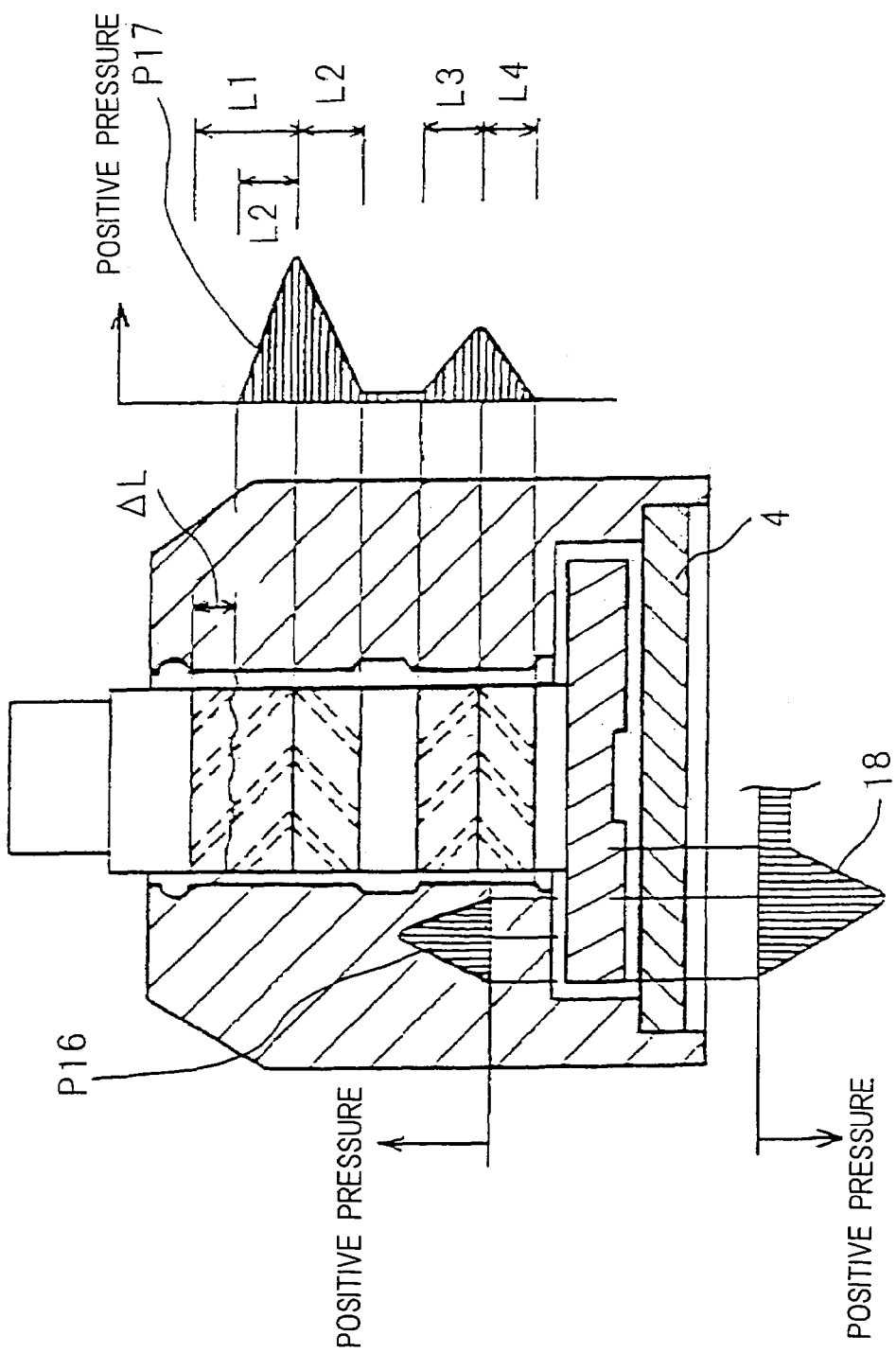
FIG. 8 is a cross-sectional view of a relevant part showing the distribution of oil pressure in the radial bearing section and the distribution of oil pressure generated by the dynamic pressure generation grooves 3A and 3B of the flange 3 in the case when the amount of oil is smaller than a specified amount in the hydrodynamic bearing in accordance with this embodiment.

FIG. 7 and FIG. 8, views showing the cross-sections of a relevant part and the pressure distributions, show detailed pressure distributions regarding the pressures generated in the radial direction (the left-to-right direction in the figure) of the dynamic pressure generation grooves 1A and 1B. FIG. 7 shows a case wherein the clearance portions of the hydrodynamic bearing are wholly filled with oil 5 and the liquid face is above the upper ends of the dynamic pressure generation grooves 1A. The dynamic pressure generation grooves 1A are provided in the upper portion of the sleeve 1 and made asymmetric such that the groove portion 28A in the range of the upper half dimension L1 is longer than the groove portion 29A in the range of the lower half dimension L2. Hence, the oil is pressed downward by the effect of dynamic pressure, thereby being prevented from leaking outside. The acute connection part of the groove portion 28A and the groove portion 29A is referred to as a turn-back part. The groove portion 28A and the groove portion 29A of the dynamic pressure generation groove 1A have the same inclination angle. In the configuration shown in FIG. 7, if the difference between the dimension L1 and the dimension L2 of the dynamic pressure generation groove 1A is too small, there is a danger of causing oil leakage. On the other hand, if the difference is too large, the internal pressure becomes too high, and there is a danger of generating cavitation or microbubbles.

In the dynamic pressure generation groove 1B, the groove portion 28B of the upper half is made symmetric with the groove portion 29B of the lower half. Since the dynamic pressure generation groove 1A is made asymmetric, the pressure inside the bearing becomes positive as indicated by pressure curve P13. Since no negative pressure is generated inside the bearing even in this case, air accumulation hardly occurs. The pressures in the thrust direction become positive as indicated by pressure curves P14 and P15, whereby no negative pressure is generated.

FIG. 8 shows a case wherein the oil inside the bearing decreases and becomes insufficient by the amount corresponding to the dimension ΔL. Even in this case, only the positive pressure is generated as indicated by pressure curve P17, whereby no negative pressure is generated inside the bearing.

Figure 9:
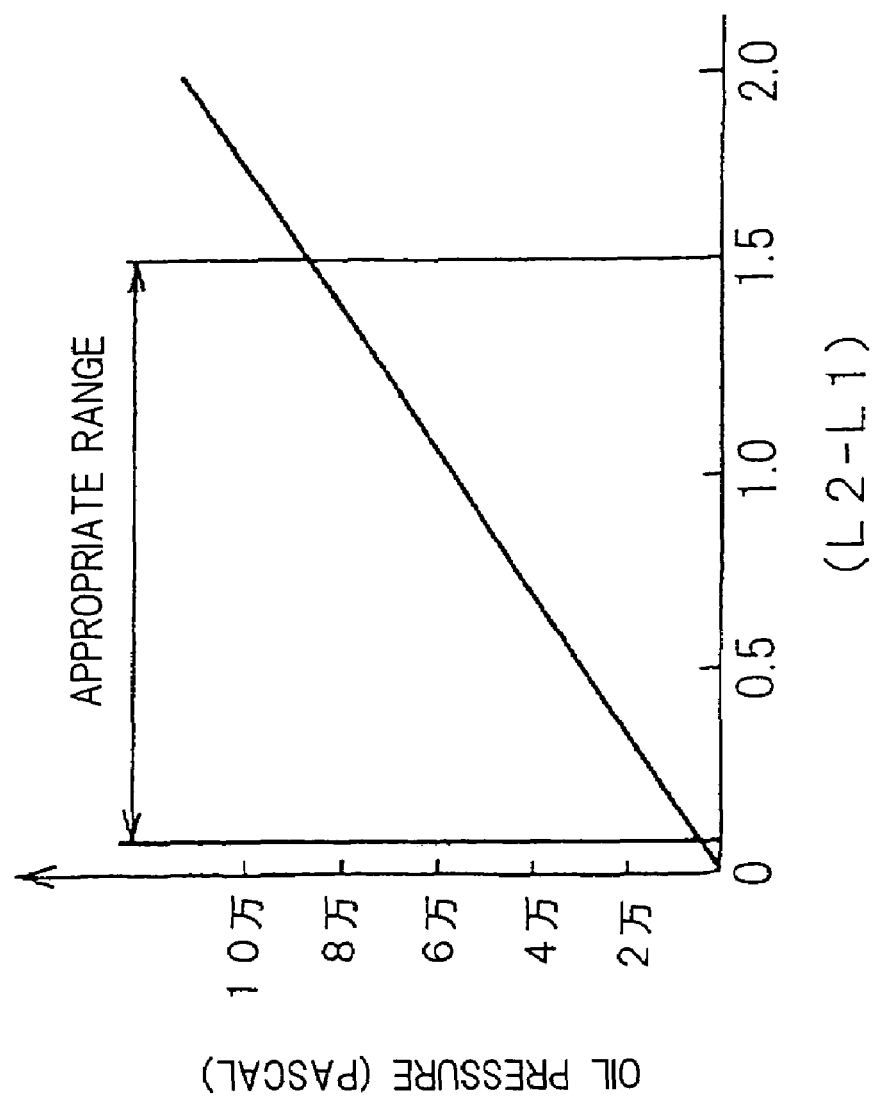
FIG. 9 is a graph showing the relationship between the oil pressure generated by the dynamic pressure generation grooves 1A and 1B and the dimensional distribution of the dynamic pressure generation grooves 1A and 1B of the hydrodynamic bearing in accordance with this embodiment.

FIG. 9 shows the appropriate range of the asymmetry of the dynamic pressure generation groove 1A. It is desirable that the dimension L2 of the groove portion 29A is smaller than the dimension L1 of the groove portion 28A, that is, the portion on the opposite side, and that the value of the relational expression shown on the left side of equation (5), wherein the difference between the dimensions L1 and L2, (L1−L2), is set in the range represented by equation (5), is in the value range shown on the right side when the diameter of the shaft 2 is in the range of 1 mm or more and 10 mm or less.

$$(L1-L2)=0.05 \text{ mm to } 1.5 \text{ mm} \tag{5}$$

As the results of various experiments, in the range shown in equation 5, the entry of air and the entry of microbubbles hardly occurred.

Figure 10:
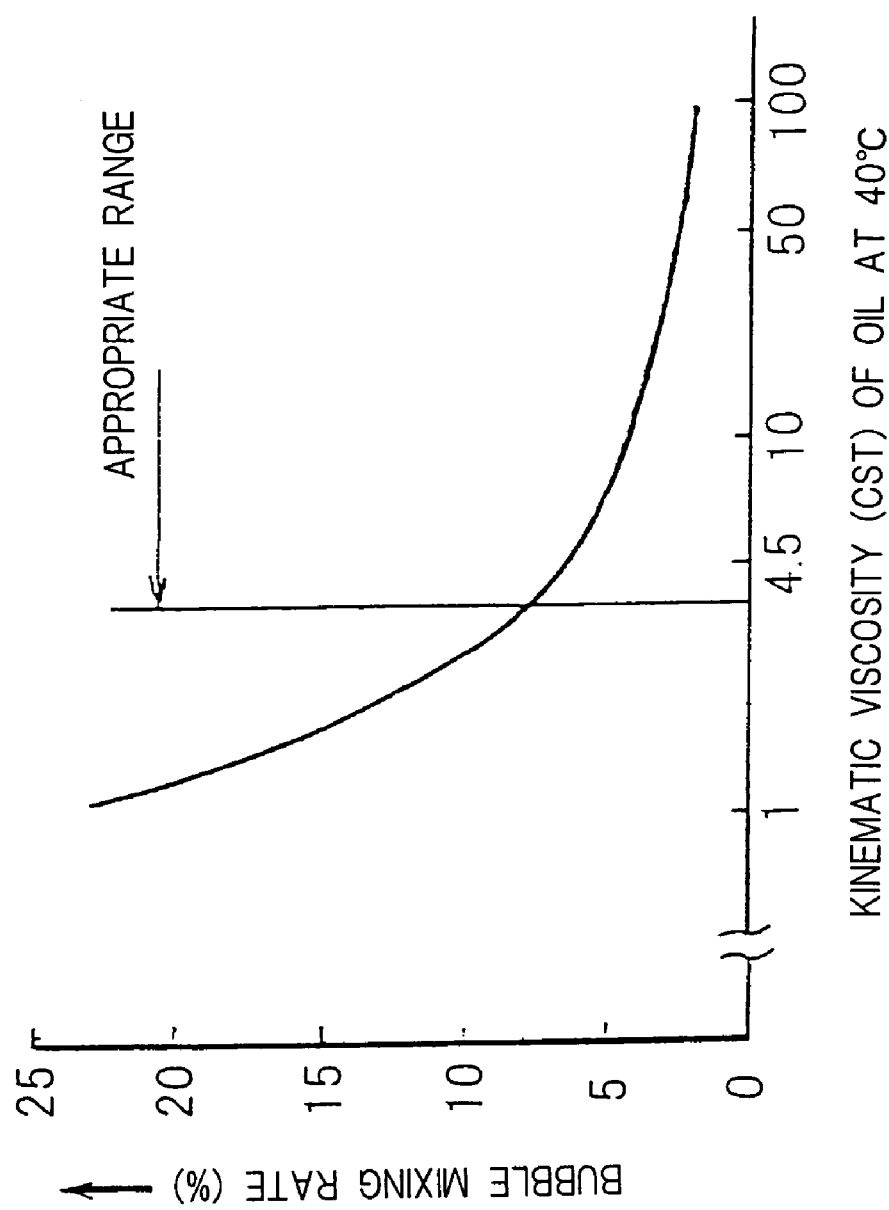
FIG. 10 is a graph showing the relationship between the bubble entry amount in oil and the kinematic viscosity of oil at 40° C. of temperature in the hydrodynamic bearing in accordance with this embodiment.

FIG. 10 shows the relationship between the kinematic viscosity of oil or the kinematic viscosity of the base oil of grease and the bubble mixing rate into the clearances of the bearing, obtained from the observation results of the experimental bearing made of the transparent materials. The bubble mixing rate is represented by the percentage of the volume of bubbles with respect to the volume of oil. According to the observation results, it was found that the bubble mixing rate was very low in the case when oil or the base oil of grease had a kinematic viscosity of 4 cSt or more at 40° C. of temperature.

Figure 11:
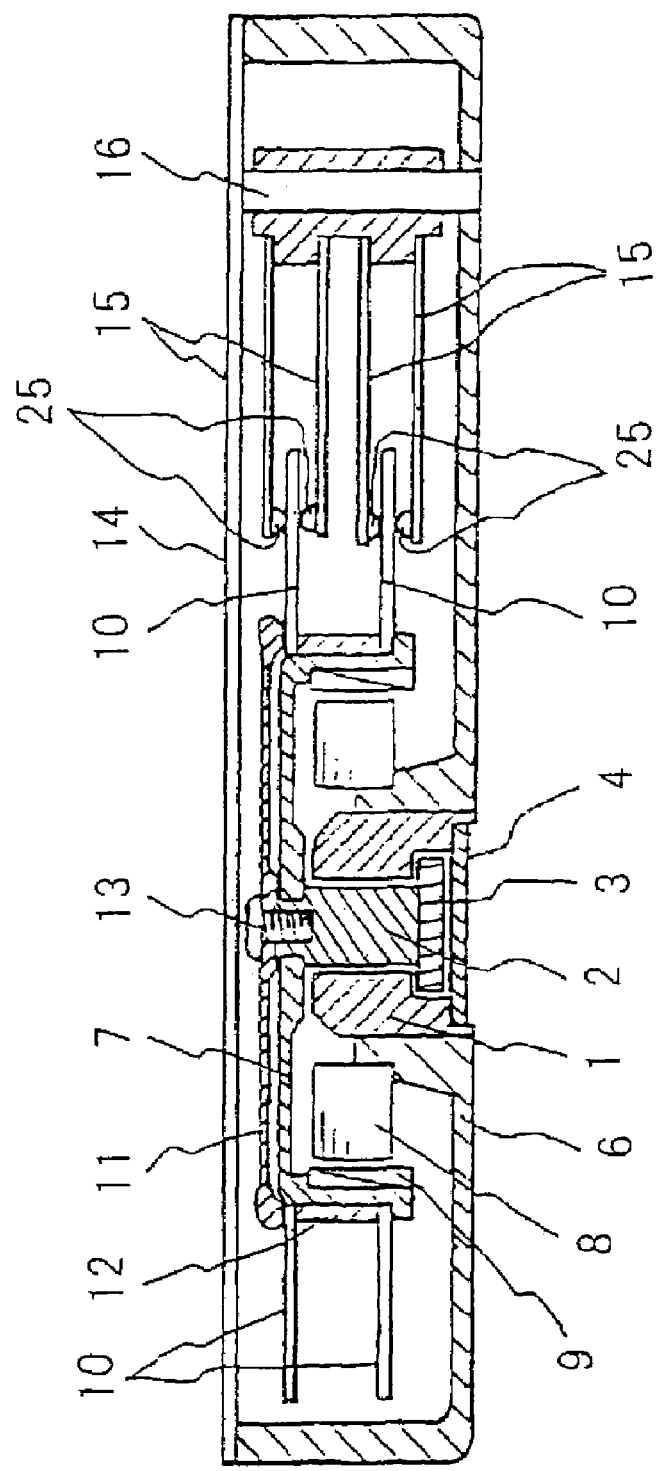
FIG. 11 is a cross-sectional view of a disc rotation apparatus using the hydrodynamic bearing in accordance with this embodiment of the present invention.
Figure 12:
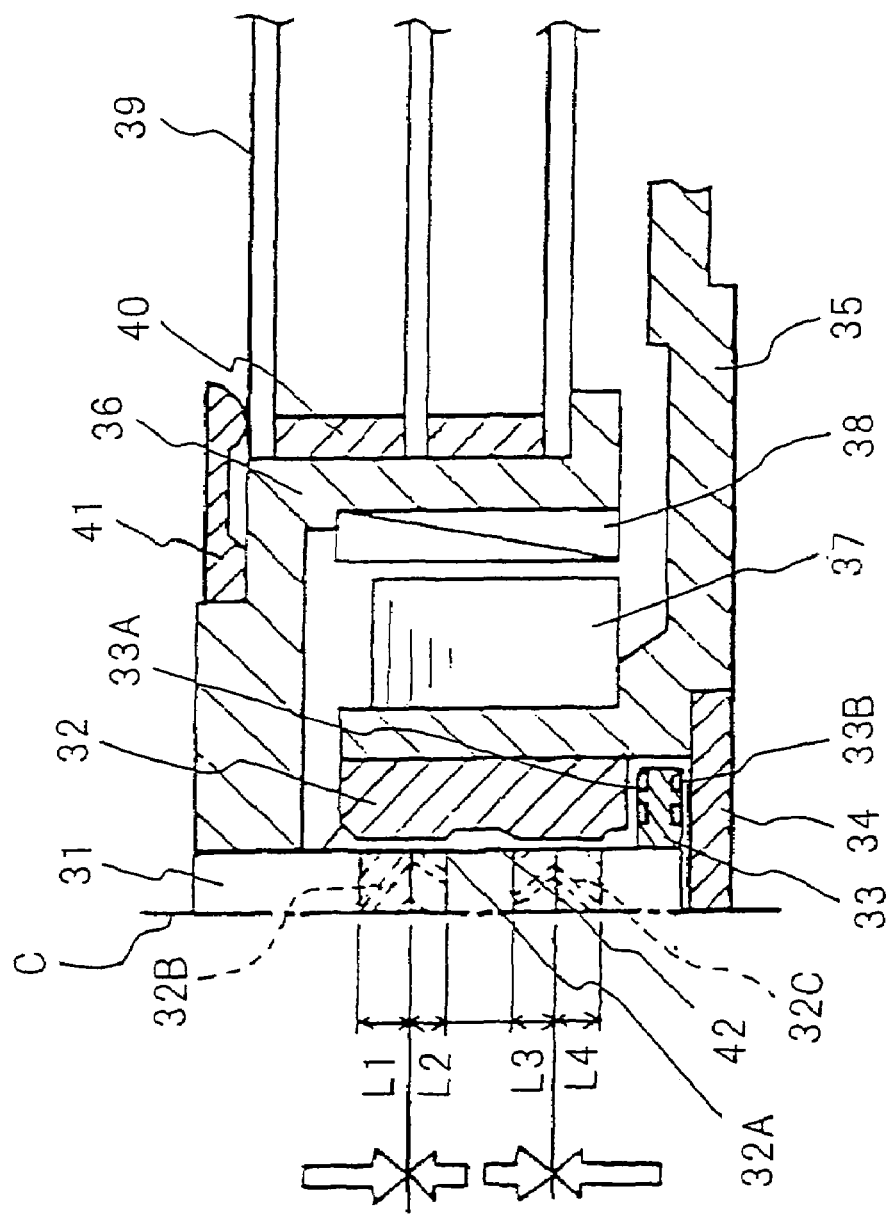
FIG. 12 is the cross-sectional view showing the right half of the conventional hydrodynamic bearing.
Figure 13:
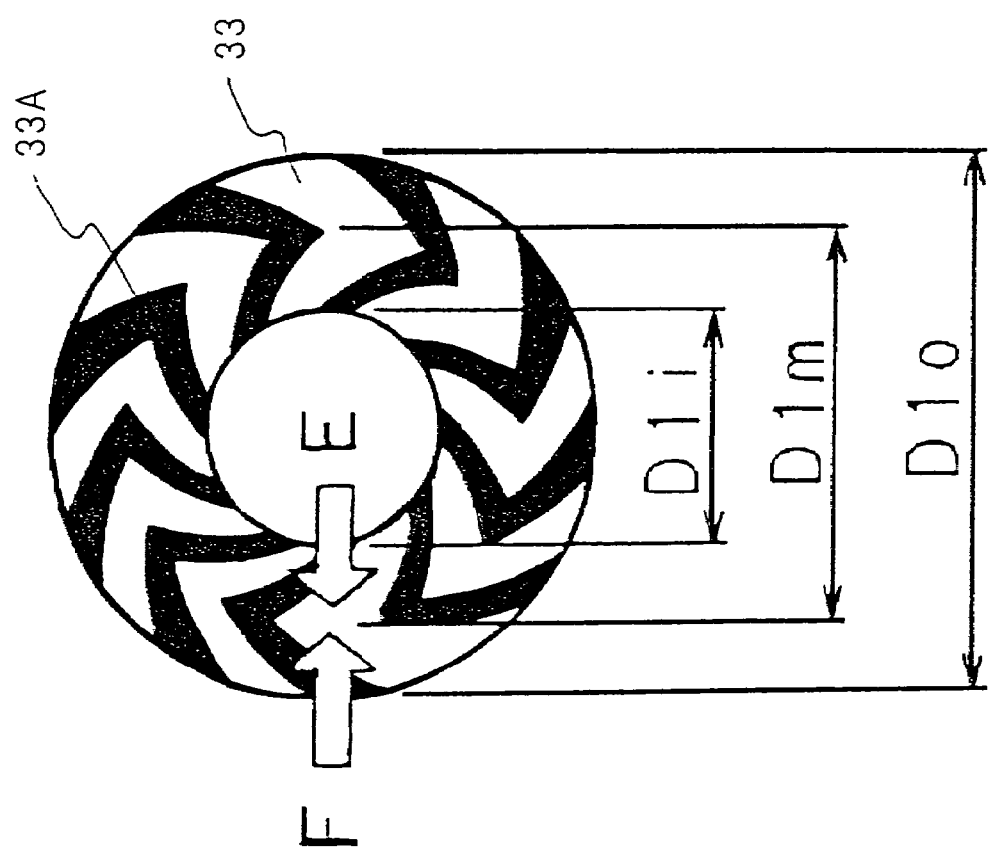
FIG. 13 is the plan view of the flange 33 of the conventional hydrodynamic bearing.
Figure 14:
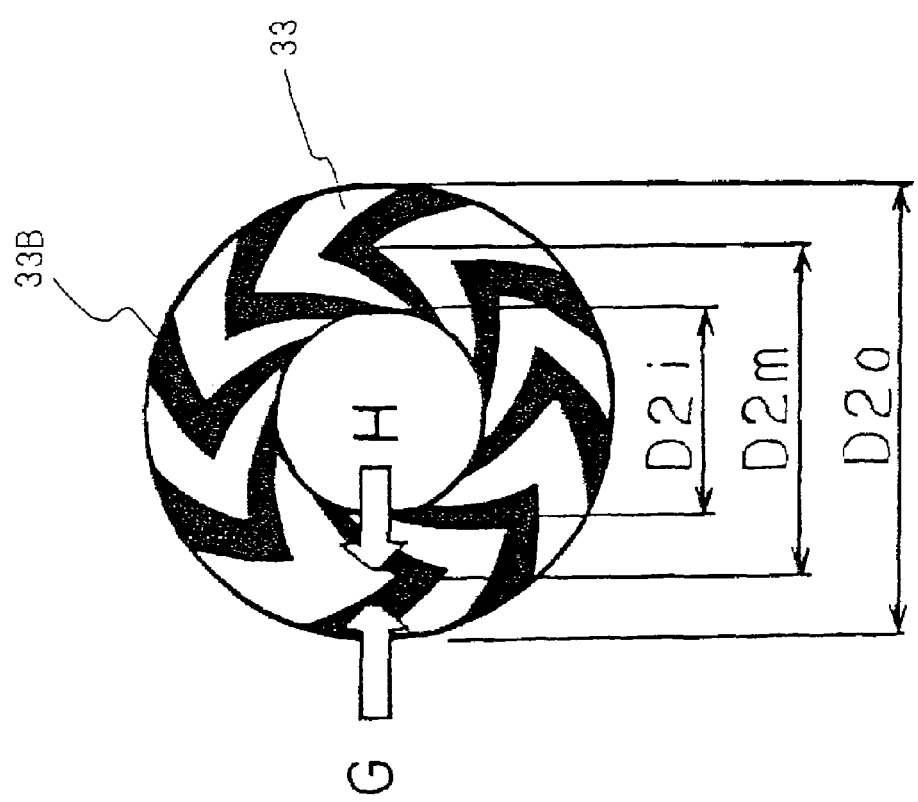
FIG. 14 is the bottom view of the flange 33 of the conventional hydrodynamic bearing.
Figure 15:
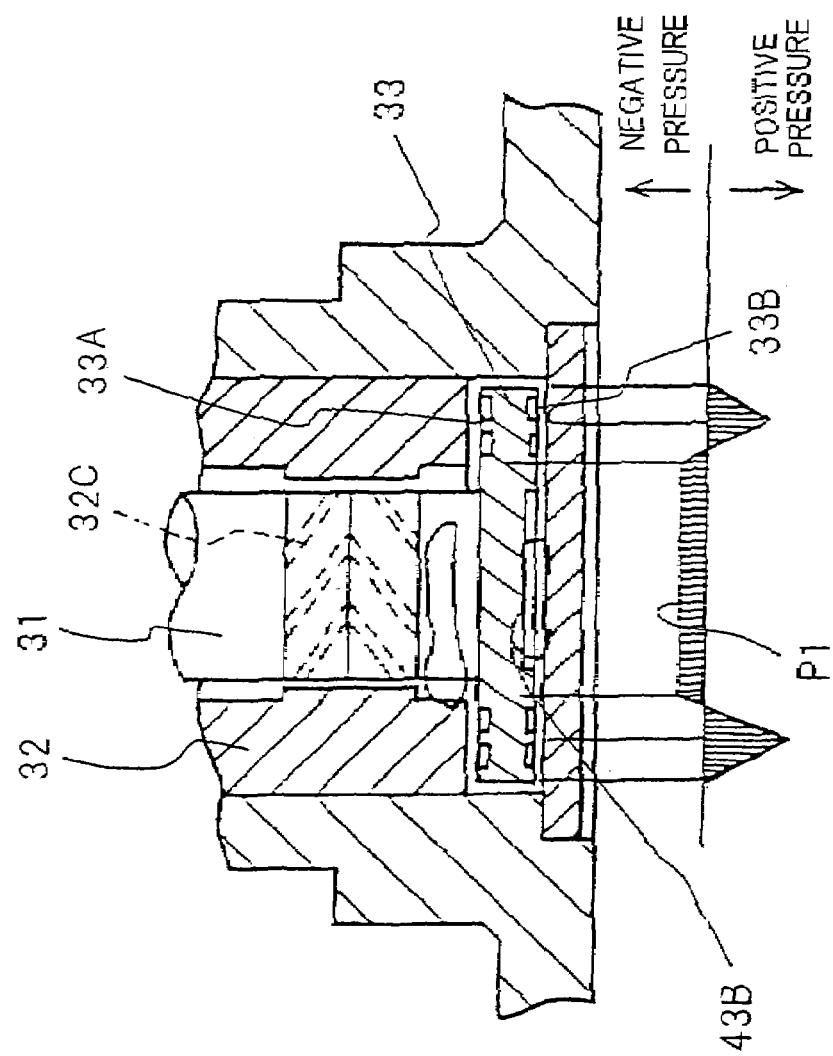
FIG. 15 is the cross-sectional view of a relevant part showing the distribution of oil pressure generated by the dynamic pressure generation grooves 33A and 33B of the flange 33 in the conventional hydrodynamic bearing.
Figure 16:
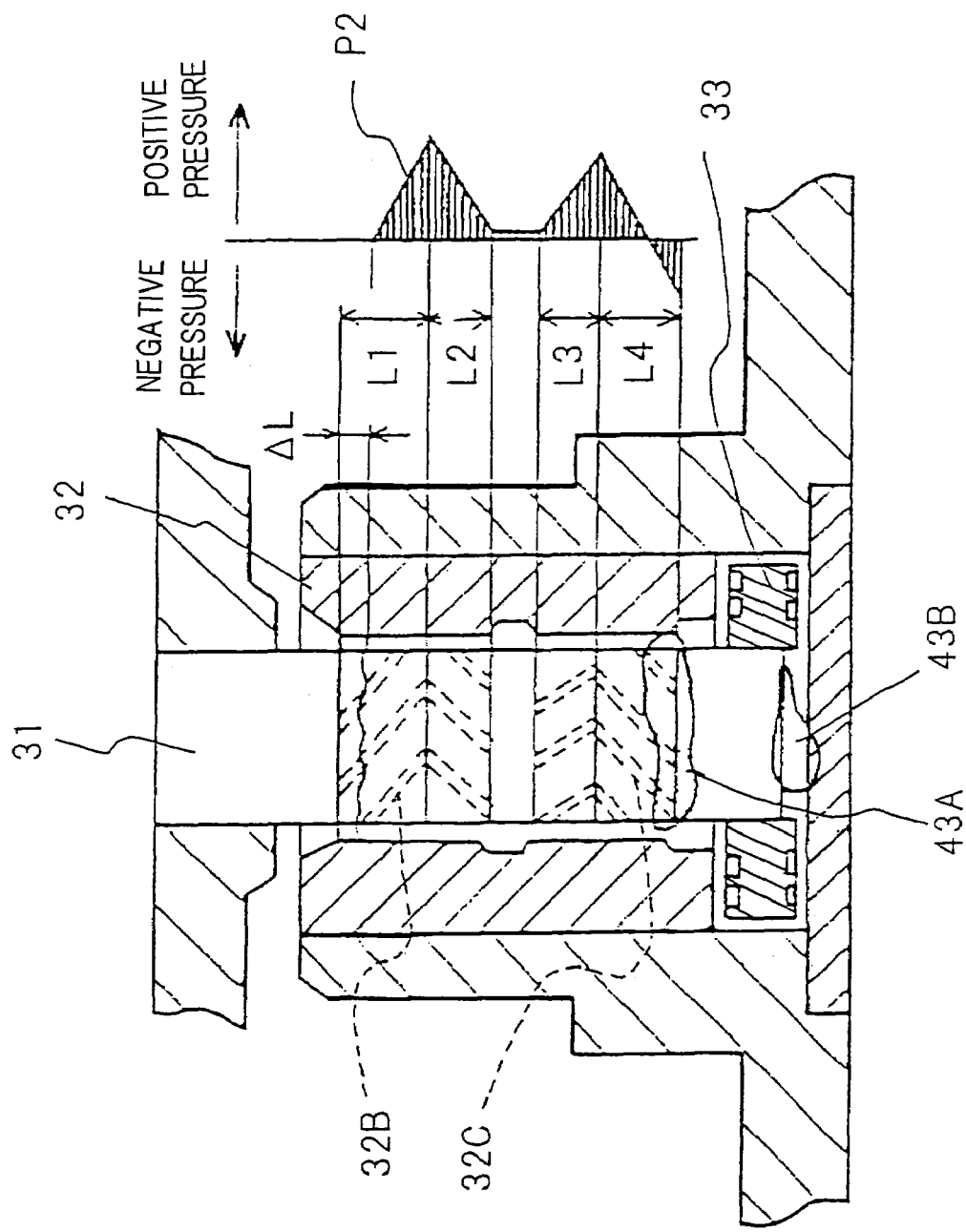
FIG. 16 is the cross-sectional view of a relevant part showing the distribution of oil pressure generated in the radial direction by the dynamic pressure generation grooves 32B and 3C of the sleeve 32 of the conventional hydrodynamic bearing.

The configuration and operation of a disc rotation apparatus using the hydrodynamic bearing in accordance with the present invention will be described by using FIG. 11. In FIG. 11, on a hydrodynamic bearing provided inside a box-shaped base 6 and comprising a sleeve 1, a shaft 2, a flange 3, a thrust plate 4, a hub rotor 7, a stator 8 and a rotor magnet 9, two discs 10 are installed while space is provided therebetween by using a spacer 12. Heads 25 respectively supported by arms 15 are opposed to both faces of the disc 10. The arms 15 rotate while being supported by a head support shaft 16. The upper face of the base 6 is hermetically sealed by an upper lid 14 so as to prevent the entry of dust and the like. When electric power is applied to the motor stator 8, a rotating magnet field is generated, and the rotor magnet 9 starts rotating together with the hub rotor 7, the shaft 2 and the discs 10. The dynamic pressure generation grooves 1A, 1B, 3A and 3B rake up oil by pumping forces and generate pressures, whereby the bearing portion floats and rotates with high accuracy in a noncontact state. The heads 25 make contact with the rotating discs 10, thereby recording or reproducing electrical signals.

Although the thrust plate is secured to the sleeve 1 in FIG. 1, it may be secured to the base 6 if the interior of the bearing can be hermetically sealed.

Even if helical dynamic pressure generation grooves, in which d1$m$=d1$o$, are used as a modification application example of the dynamic pressure generation grooves 3A shown in FIG. 2, instead of the herringbone-shaped grooves, nearly equivalent performance can be obtained.

As mentioned above, with the hydrodynamic bearing in accordance with this embodiment, the entry of air into the hydrodynamic bearing section is prevented, and the breakage of oil film, having been apt to occur in bearings, is prevented. As a result, a long-life disc rotation apparatus capable of rotating discs with high accuracy is obtained by using the hydrodynamic bearing in accordance with the present invention.

In addition, the design conditions of the dynamic pressure generation grooves are combined with the selection conditions of the kinematic viscosity of oil so that the accumulation of air inside the bearing due to the pumping forces in the dynamic pressure generation grooves is prevented during rotation, therefore the breaking of oil film in the clearances of the bearing does not occur, whereby the hydrodynamic bearing in accordance with the present invention has high accuracy and long life.

The invention claimed is:

1. A hydrodynamic bearing comprising:
a sleeve having a bearing hole at the nearly central portion thereof,
a shaft rotatably inserted into said bearing hole of said sleeve, and
a nearly disc-shaped flange secured to one end of said shaft, one face of said flange opposing to the end face of said sleeve and the other face thereof opposing to a thrust plate provided to hermetically seal a region including said end face of said sleeve, wherein
herringbone-shaped first and second dynamic pressure generation grooves are provided on at least one of the inner circumferential face of said sleeve and the outer circumferential face of said shaft so as to be arranged in the direction along said shaft,
herringbone-shaped third dynamic pressure generation grooves are provided on at least one of the mutually opposed faces of said flange and said thrust plate,
said first, second and third dynamic pressure generation grooves are filled with oil having a kinematic viscosity of 4 cSt or more at 40° C. of temperature,
one of said sleeve and said shaft is secured to a base and the other is secured to a rotatable hub rotor, and
where an outside diameter of the herringbone pattern of said third dynamic pressure generation groove is designated as d1$o$, an inside diameter thereof is designated as d1$i$, a diameter of the turn-back part of the herringbone pattern is designated as d1$m$, the value of the diameter d1$m$ being in the range of 1 mm or more and 10 mm or less, wherein a diameter where the oil pressure generated by said third dynamic pressure generation grooves in the direction from the outer circumference to the inner circumference of said flange equals the oil pressure generated in the direction from the inner circumference to the outer circumference thereof is designated as dsy and is represented by:

$dsy=\{(d1i^2+d1o^2)/2\}^{1/2}$, the diameter d1$m$ of the turn-back part is determined so that the value obtained by subtracting the diameter d1$m$ from the diameter dsy, (dsy−d1$m$), is in the range of 0.05 mm or more and 0.8 mm or less.

2. A hydrodynamic bearing comprising:
a sleeve having a bearing hole at the nearly central portion thereof,
a shaft rotatably inserted into said bearing hole of said sleeve, and
a nearly disc-shaped flange, secured to one end of said shaft, one face of said flange opposing to the end face of said sleeve and the other face thereof opposing to a thrust plate provided to hermetically seal a region including said end face of said sleeve, wherein
herringbone-shaped first and second dynamic pressure generation grooves are provided on at least one of the inner circumferential face of said sleeve and the outer circumferential face of said shaft, among said first and second dynamic pressure generation grooves, where the grooves away from said thrust plate are designated as said first dynamic pressure generation grooves and the grooves close thereto are designated as said second dynamic pressure generation grooves,
a first length L1 of the groove portion which is away from said thrust plate in said herringbone-shaped first dynamic pressure generation groove in the direction of said shaft is larger than a second length L2 of the groove portion which is close to said thrust plate in the direction of said shaft, and the value of a calculation expression, (L1+L2)/(2×L2) represented by said first length L1 and said second length L2, is in the range of 1.02 to 1.60, said herringbone-shaped second dynamic pressure generation groove is made symmetric with respect to a line passing through herringbone-shaped turn-back parts, herringbone-shaped third dynamic pressure generation grooves are provided on at least one of the opposed faces of said flange and said thrust plate, said first, second and third dynamic pressure generation grooves are filled with oil having a kinematic viscosity of 4 cSt or more at 40° C. of temperature, one of said sleeve and said shaft is secured to a base and the other is secured to a rotatable hub rotor, and where an outside diameter of the herringbone pattern of said third dynamic pressure generation groove is designated as $d1o$, an inside diameter thereof is designated as $d1i$, a diameter of the turn-back part of the herringbone pattern is $d1m$, wherein a diameter where the oil pressure generated by said third dynamic pressure generation grooves in the direction from the outer circumference to the inner circumference of said flange equals the oil pressure generated in the direction from the inner circumference to the outer circumference thereof is designated as dsy and is represented by:

$dsy=\{(d1i^2+d1o^2)/2\}^{1/2}$, the diameter d1m of said turn-back portion is determined so that when the diameter of said shaft is in the range of 1 mm or more and 10 mm or less, the value obtained by subtracting said length L2 from said length L1 is set in the range of 0.05 or more and 1.5 mm or less, the diameter $d1m$ is in the range if 1 mm or more and 10 mm or less, and the value obtained by subtracting the diameter $d1m$ from the diameter dsy is in the range of 0.05 mm or more and 0.8 mm or less.

3. A hydrodynamic bearing in accordance with claim 1, wherein herringbone-shaped fourth grooves are provided on at least one of the opposed faces of said flange and said sleeve, and where the outside diameter of the herringbone pattern of said fourth groove is designated as $d2o$, the inside diameter thereof is designated as $d2i$ and the diameter of the turn-back part is designated as $d2m$, a relationship represented by $d2m=\{(d2i^2+d2o^2)/2\}^{1/2}$ is satisfied.

4. A disc rotation apparatus for recording or reproducing signals, wherein a recording/reproduction disc is concentrically secured to said hub rotor of said hydrodynamic bearing in accordance with claim 1 and rotated, magnetic heads or optical heads are provided so as to be opposed to the faces of said rotating disc, and said magnetic heads or optical heads are configured so as to be movable in parallel with the faces of said disc.

* * * * *